United States Patent [19]
Nishiyama

[11] Patent Number: 5,645,920
[45] Date of Patent: Jul. 8, 1997

[54] RECORDING PAPER AND RECORDING APPARATUS USING SAME

[75] Inventor: Masataka Nishiyama, Tokyo, Japan

[73] Assignee: Asahi Kogaku Kogyo Kabushiki Kaisha, Tokyo, Japan

[21] Appl. No.: 725,845

[22] Filed: Sep. 30, 1996

Related U.S. Application Data

[63] Continuation of Ser. No. 230,112, Apr. 20, 1994, abandoned, which is a continuation of Ser. No. 934,403, Aug. 24, 1992, Pat. No. 5,329,300.

[30] Foreign Application Priority Data

Aug. 30, 1991 [JP] Japan .................................. 3-246895
Aug. 30, 1991 [JP] Japan .................................. 3-246896
Aug. 30, 1991 [JP] Japan .................................. 3-246897

[51] Int. Cl.⁶ .................................................. B32B 3/00
[52] U.S. Cl. ........................ 428/195; 428/207; 428/211; 428/411.1; 428/488.1; 428/688; 428/913; 503/201; 503/204
[58] Field of Search ........................... 428/195, 207, 428/211, 411.1, 488.1, 688, 913; 503/201, 204

[56] References Cited

U.S. PATENT DOCUMENTS

| | | | |
|---|---|---|---|
| 5,045,420 | 9/1991 | Hosono et al. | 430/45 |
| 5,166,041 | 11/1992 | Murofushi et al. | 430/339 |
| 5,234,783 | 8/1993 | Ng | 430/45 |
| 5,346,801 | 9/1994 | Watanabe et al. | 430/253 |

*Primary Examiner*—William Krynski
*Attorney, Agent, or Firm*—Kane, Dalsimer, Sullivan, Kurucz, Levy, Eisele and Richard, LLP

[57] ABSTRACT

A recording paper including a color varying layer which normally exhibits a predetermined color and a substrate layer having a color different from that of the color varying layer, wherein the predetermined color disappears when a beam of specific wavelength is incident thereon.

7 Claims, 3 Drawing Sheets

RECORDING PAPER AND RECORDING APPARATUS USING SAME

This application is a continuation of application Ser. No. 08/230,112, filed Apr. 20, 1994, now abandoned, which is a continuation of 07/934,403, Aug. 24, 1992, now U.S. Pat. No. 5,329,300.

BACKGROUND OF THE INVENTION

1. Field of the Invention

The present invention relates to a recording paper on which an image, such as letters, can be directly recorded by beam scanning. The invention further relates to a recording apparatus, such as a printer or copier, etc., for recording information on the recording paper.

2. Description of Related Art

It is known to use a coloring agent having a predetermined color which disappears when a specific wavelength is made incident thereon as a copying toner. Namely, if the coloring agent is used as a copying toner, information recorded on a copying paper is erased when the copying paper receives a beam of specific wavelength incident thereon, thereby restoring the copying paper so that it may be reused. An article entitled "Trends" in "NIKKEI MECHANICAL" dated Jul. 22, 1991 discloses such a toner.

The known coloring agent is made of a mixture of IR820B which is a blue cyanine dye and ammonium salt of organic boron compound. When a wavelength of 820 nm (near-infrared radiation) is incident on the coloring agent, the blue color disappears, so that the coloring agent becomes transparent. It is assumed that this phenomenon occurs due to an irreversible reaction which occurs when the IR820B absorbs the wavelength of 820 nm in the presence of ammonium salt of organic boron compound, which functions as a catalyst.

However, the applicability of such a coloring agent has been limited to a copying toner to make copying papers reusable. Namely, the conventional concept of the application of the coloring agent is addressed only to reusable copying paper.

In a conventional laser printer, a laser beam is on-off modulated in accordance with printing data output from a computer to form a latent image on a photosensitive drum. The latent image is then transferred to the recording paper through a toner. This type of laser printer is accordingly complex.

Furthermore, in a conventional copying machine, an image is formed on a photosensitive drum by light reflected from an original document (manuscript, etc.) to be copied and the image is then transferred to the recording paper through a toner, again, resulting in a complex construction.

SUMMARY OF THE INVENTION

The primary object of the present invention is to provide a recording paper on which an image, such as a letter, can be directly recorded or drawn using the above-mentioned type of coloring agent and laser beam.

A further object of the present invention is to provide a recording apparatus which can easily record information on the recording paper.

Still a further object of the present invention is to provide a simple printer and copier using the recording paper.

According to the present invention, there is provided a recording paper comprising a color varying layer which normally exhibits a predetermined color, but which color disappears when a specific wavelength is incident thereon, and a substrate layer having a color different from that of the color varying layer.

With this structure, an image, such as a letter or figure, can be directly formed on the recording paper by beam scanning. Namely, since only the portions of the color varying layer on which the laser beam of specific wavelength is incident become transparent, the color of the substrate layer appears to obtain a desired image. The beam scanning technology is per se known in a conventional printer or copier, etc. Accordingly, a desired image can be easily recorded on recording paper by using the image recording system in which the special recording paper proposed in the present invention is used.

Preferably, the color varying layer is made of a mixture of IR820B (a type of cyanine dye) and ammonium salt of organic boron compound. The specific wavelength is near-infrared 820 nm.

The present invention is also directed to a printer and a copier in which the recording paper, according to the present invention, is used to make possible the direct recording of a desired image by beam scanning.

Consequently, it is not necessary to provide a photosensitive body (photosensitive drum) which transfers information (i.e., an image) to be copied or printed on recording paper in a copier or printer of the present invention.

To this end, a printer according to the present invention comprises a recording paper which includes a color varying layer exhibiting a predetermined color in a normal state, however, the color of which disappears when a laser beam of specific wavelength is incident thereon. The printer further comprises a substrate layer having a color different from that of the color varying layer, a paper feeding mechanism which feeds the recording paper, a light source which emits a laser beam having a specific wavelength, and a beam scanner which modulates the laser beam in accordance with predetermined printing data and scans the recording paper while the paper is being fed by the paper feeding mechanism.

In the printer described above, an information transferring photosensitive drum, a toner supplier, and a fixing device, etc., are all unnecessary, thereby allowing for the realization of a simple printer.

According to another aspect of the present invention, a copying machine, in which the recording paper specified above is used, comprises a beam scanner which optically scans a manuscript to be copied with the laser beam, a paper feeding mechanism which feeds the recording paper at a speed synchronous with the scanning speed of the beam scanner, and an image forming optical system which converges light reflected from the manuscript onto the moving recording paper.

With this printer, a photosensitive drum which is used to transfer the image of the manuscript thereto, a toner supplier, and a fixing device, etc., are all unnecessary, resulting in the realization of a simple copier, similar to the printer as mentioned above.

The recording paper, according to the present invention, can be used instead of a recording paper for a conventional diazo copier (blue copy). In this case, a light source which emits a specific wavelength is used along with a paper feeding mechanism which feeds a recording paper superimposed on a transparency, so that the recording paper receives the specific wavelength incident thereon at portions other than the manuscript of the transparency. A developing device which was indispensable in the conventional diazo copier can be omitted.

BRIEF DESCRIPTION OF THE DRAWINGS

The invention will be described below in detail with reference to the accompanying drawings, in which.

DESCRIPTION OF THE PREFERRED EMBODIMENT

Figure 1:
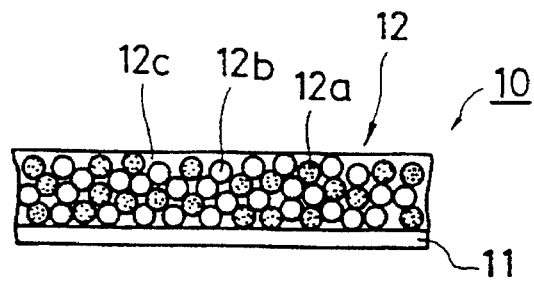
FIG. 1 is a schematic view of a recording paper according to a first embodiment of the present invention.

FIG. 1 shows a first embodiment of a recording paper according to the present invention. In FIG. 1, a recording paper 10 has a substrate layer (base) 11 and a color varying layer 12 provided on the substrate layer 11. The color varying layer 12 is made of a paint 12c having a mixture of IR820B grains (cyanine dye) 12a and ammonium salt grains 12b of organic boron compound 12b. The color varying layer 12 normally exhibits a blue color from the IR820B grains 12a.

The ammonium salt of organic compound 12b is comprised of, for example, tetrabutylammonium butylphenylborate. The chemical formula of IR 820B is shown below. These materials are shown in an article entitled "Trends" in "NIKKEI MECHANICAL" dated Jul. 22, 1991.

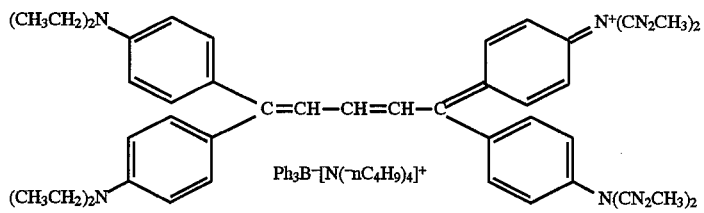

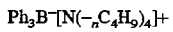

The base 11 exhibits a color other than blue. The color of base 11 is preferably selected from those having a high contrast with respect to blue. However, a color having a low contrast with respect to blue, such as black, etc. may be used.

Figure 2:
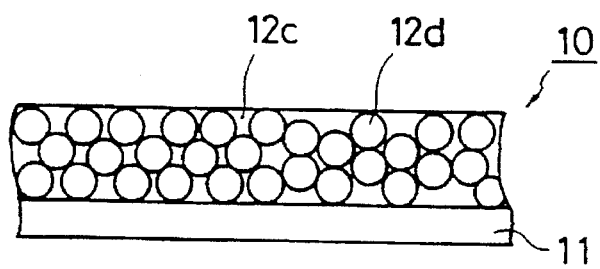
FIG. 2 is a schematic view of a recording paper according to a second embodiment of the present invention.
Figure 3:
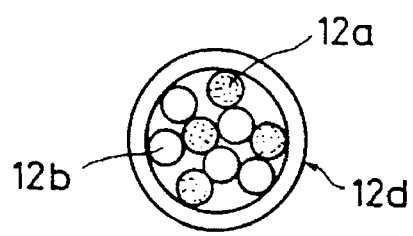
FIG. 3 is an enlarged schematic view of a transparent capsule which constitutes a color varying layer of a recording paper shown in FIG. 2.

FIGS. 2 and 3 show another embodiment of the present invention, in which the Grains 12a of IR820B (cyanine dye) and grains 12b of ammonium salt of organic boron compound are contained in transparent capsules 12d which are adhered to the substrate 11 by paint 12c.

Figure 4:
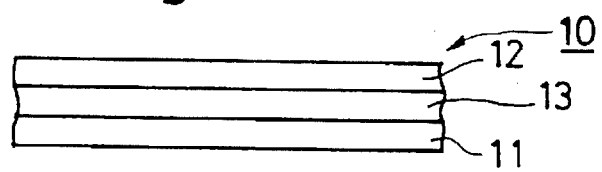
FIG. 4 is a schematic view of a recording paper according to a third embodiment of the present invention.

FIG. 4 shows a third embodiment of the present invention, in which an intermediate layer (undercoat) 13 is additionally provided between the substrate layer 11 and the color varying layer 12.

Figure 5:
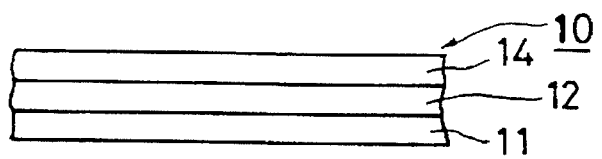
FIG. 5 is a schematic view of a recording paper according to a fourth embodiment of the present invention.

In a fourth embodiment of the present invention, FIG. 5 shows a transparent protection layer 14 additionally provided on the color varying layer 12.

When recording paper 10, as constructed above, is scanned with a beam 820 nm in wavelength (near-infrared radiation) only the portions of the color varying layer 12 receiving the incident beam become transparent, so that a desired image (letters, figures, etc.,) appear having a color of the substrate 11 or the intermediate layer 13.

A beam scanning technology which is per se known, for example, in a printer or a copying machine, etc., can be employed to obtain a desired image in the present invention.

Recording paper 10, on which the image (information) has been recorded, can be reused after illuminating the entire color varying layer 12 with light 820 nm in wavelength, so that the entire color varying layer 12 becomes transparent, the remaining color of the paper being identical to that of the substrate 11 or the undercoat 13.

As can be seen from the above discussion, a recording paper on which a desired image (letters, figures, etc.) can be formed by making light of specific wavelength incident thereon can be obtained. Consequently, a printer or copier can be simplified by the use of a recording paper of the present invention.

Figure 6:
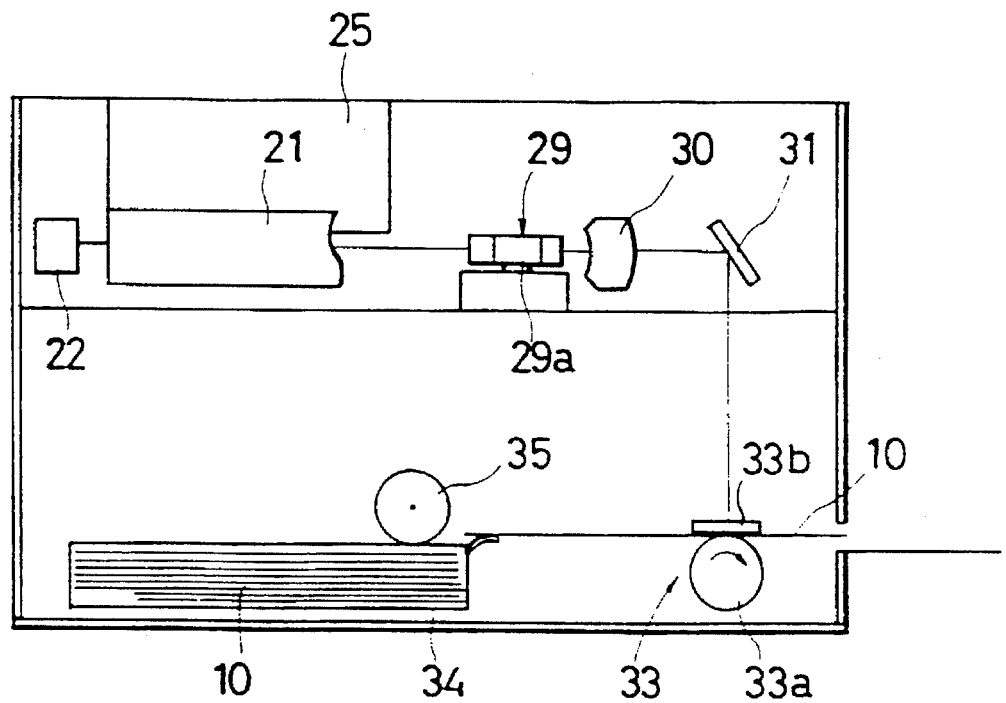
FIG. 6 is a schematic sectional view of a printer using a recording paper according to the present invention.
Figure 7:
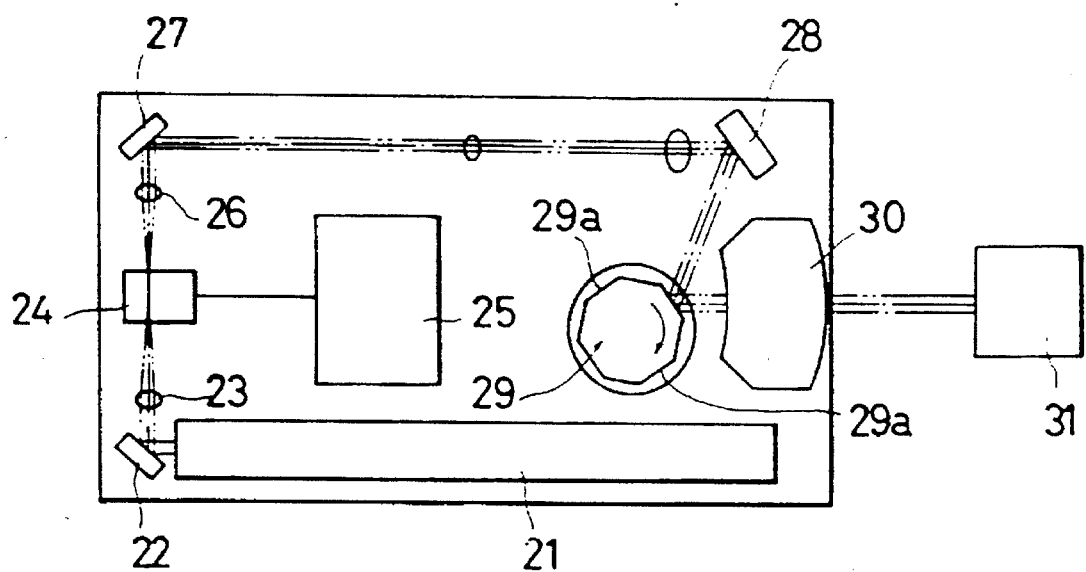
FIG. 7 is a developed plan view of a printer illustrated in FIG. 6.

FIGS. 6 and 7 show an embodiment of a printer according to the present invention in which the recording paper 10 mentioned above is used.

The 820 nm laser beam emitted from a laser source (laser diode) 21 is made incident upon an on-off modulator 24 through a mirror 22 and a condenser lens 23. The laser beam is on-off modulated by the on-off modulator 24 in accordance with printing data stored in a computer 25. The modulated laser beam is then collimated by a collimating lens 26 and made incident upon a rotatable polygonal mirror 29 through mirrors 27 and 28. The laser beam reflected by reflecting surfaces 29a of the polygonal mirror 29 is converged onto the recording paper 10 which is fed by a paper feeding mechanism 33 through an f θ lens 30 and a mirror 31.

The paper feeding mechanism 33 which is known per se includes a feeding roller 33a and a transparent glass 33b through which the laser beam is transmitted. The recording papers 10 are accommodated in a paper feeding tray 34 and are discharged therefrom by a paper discharging roller 35. The recording paper 10 fed by the paper feeding mechanism 33 moves underneath the transparent glass 33b. The speed at which the recording paper 10 is fed is synchronous with the rotational speed of the polygonal mirror 29, so that when the 820 nm laser beam, which is on-off modulated in accordance with the printing data, is incident upon the recording paper 10 while the paper is being moved, portions of the color varying layer 12 of the recording paper 10 that receive the laser beam become transparent. As a result, only the color of the base 11 or the undercoat 13 appears at the portions thereof corresponding to the transparent portions of the color varying layer 12. Thus, a direct printing can be effected. It should be appreciated that no further process, such as a development or fixation, etc., is needed thereafter.

The used recording paper 10 can be used as a color paper having a color identical to that of the substrate 11 or the undercoat 13 by illuminating the entire color varying layer 12 of the used recording paper with light of 820 nm, so that the entire color varying layer 12 becomes transparent. As can be understood from the above discussion, according to the present invention, a specific wavelength, which is on-off modulated in accordance with predetermined printing data, is directly made incident on the recording paper on which a desired image can be formed by the incident specific wavelength. Accordingly, an image transferring photosensitive drum, a toner, a developing device, and a fixing device, etc., which were all necessary in the conventional printer can be dispensed with, resulting in the realization of a simple and inexpensive printer.

Figure 8:
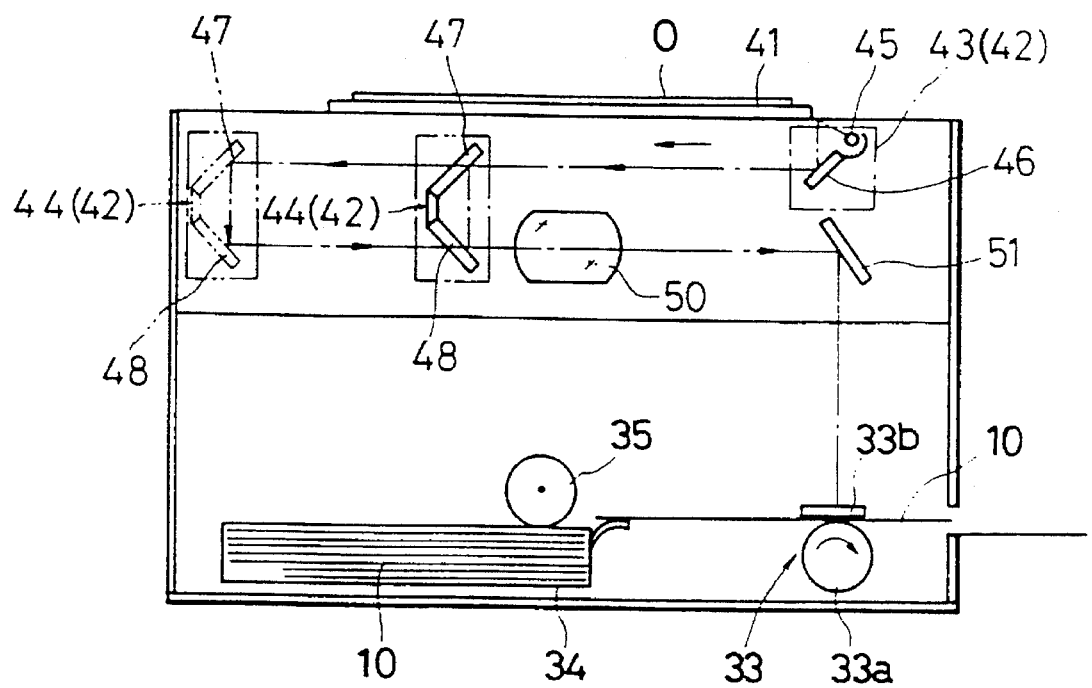
FIG. 8 is a schematic sectional view of a copier using a recording paper according to the present invention; and, FIG. 9 is a schematic sectional view of a copier using a recording paper according to another embodiment of the present invention.

FIG. 8 shows an embodiment of a copying machine in which the recording paper 10 is used, according to the present invention.

In FIG. 8, a beam scanner 42 is provided below a manuscript supporting glass plate 41 on which a manuscript O (original document) is to be copied. As is well known, the beam scanner 42, which is identical to that in a known copier, includes a full speed unit 43 which moves in a direction parallel with the plane of the glass plate 41 and a half speed unit 44 which moves in the same direction at a speed half the speed of the full speed unit 43. The full speed unit 43 is provided with a light source 45 which emits light of 820 nm (near infrared radiation) and a mirror 46. The half speed unit 44 is provided with a pair of mirrors 47 and 48.

Light emitted from the light source 45 is reflected by the manuscript O on the glass plate 41, and is then reflected by the mirrors 46, 47, and 48 to be made incident upon an image forming lens system 50. The image forming lens system 50 together with an immovable mirror 51 constitutes an image forming optical system which converges the light reflected from the manuscript O directly onto the recording paper 10, fed by the paper feeder 33, to form an image. The paper feeder 33 is identical to that of the printer shown in FIG. 6. Namely, the paper feeder 33 includes a feeding roller 33a and a transparent glass 33b through which the light reflected by the manuscript O is transmitted.

The recording paper 10 which is accommodated in the feeding tray 34 are discharged therefrom by a paper discharging roller 35. The recording paper 10, fed by the paper feeding mechanism 33, moves underneath the transparent glass 33b. The speed at which the recording paper 10 is fed is synchronous with the scanning speed of the beam scanner 42, so that when light reflected by the manuscript O is incident upon the recording paper 10, through the image forming lens system 50 and the immovable mirror 51, an image corresponding to the black and white pattern of the manuscript O is formed on the recording paper 10. Namely, portions of the color varying layer 12 of recording paper 10 that receive the reflected light become transparent. As a result, only the color of base 11 or undercoat 13 appears at the portions thereof corresponding to the transparent portions of the color varying layer 12. Thus, a direct recording can be effected. It should be appreciated that no further process, such as a development or fixation, etc., is needed.

A lens having a fixed focal length can be used as the image forming lens system 50 in an equi-magnification (constant magnification) type copier and a zoom lens can be used in a variable magnification type copier.

Figure 9:
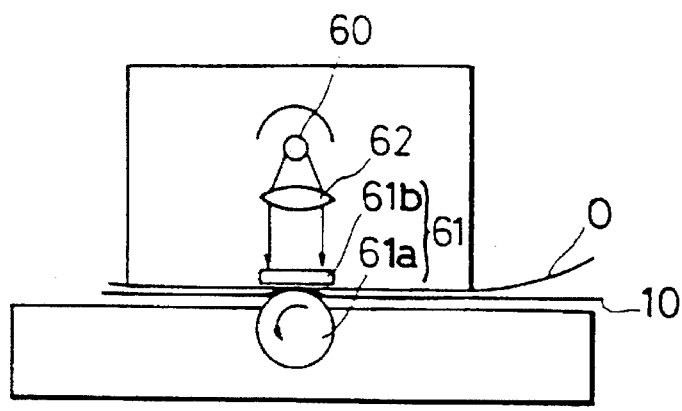

FIG. 9 shows another embodiment of a copier according to the present invention. A copier illustrated in FIG. 9 can be used in place of an existing diazo copier. In FIG. 9, the light source 60 emits light of 820 nm wavelength. The paper feeder 61 has a paper feeding roller 61a and a transparent glass 61b, similar to the embodiment illustrated in FIG. 8. The recording paper 10 and the transparent manuscript O superimposed thereon are fed between the paper feeding roller 61a and the transparent glass 61b at a predetermined speed. During the movement of the recording paper 10 and the transparent manuscript O, light emitted from the light source 60 is made incident upon the recording paper 10 by the condenser lens 62 through the manuscript O.

In the modified embodiment illustrated in FIG. 9, a black and white image pattern of the manuscript O is recorded on the recording paper 10. Again, neither development nor fixation are needed after recording.

Recording paper 10 can be reused after illuminating the entire color varying layer 12 of the used recording paper with light of 820 nm, so that the whole color varying layer 12 becomes transparent leaving the remaining paper with a color identical to that of the substrate 11 or the undercoat 13, similar to the above-mentioned embodiment applied to a printer.

As can be seen from the above discussion, according to the present invention, since light reflected by the manuscript is directly made incident on the recording paper, on which a desired image can be formed by a specific wavelength incident thereon, an image transferring photosensitive drum, a toner, a developing device, and a fixing device, etc., which were all necessary in a conventional copier, can be dispensed with, resulting in the realization of a simple and inexpensive copier.

Having thus described the invention, what is claimed is:

1. A recording paper having on a recording surface thereof a first layer and a second layer overlying and blocking said first layer, said first layer being colored a first color and said second layer being of a second color different from said first color, said second layer being opaque to said first layer and formed of a compound that becomes transparent to said first layer when said second layer is exposed to a beam of light of a specific wavelength.

2. A recording layer in accordance with claim 1 wherein the color varying layer is made up of a mixture of a cyanine dye in accordance with the following formula

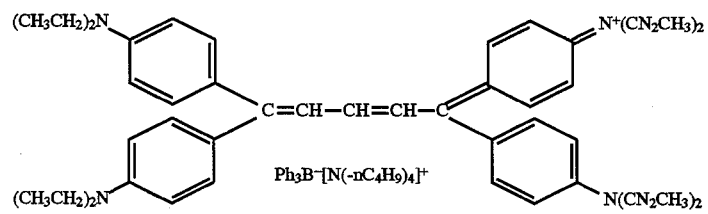

and ammonium salt of organic boron compound.

3. A recording paper according to claim 2, wherein the specific wavelength is a near-infrared beam.

4. A recording paper according to claim 3, wherein the specific wavelength is 820 nm.

5. A recording paper in accordance with claim 1 wherein said first color and second color are contrasting.

6. A recording paper in accordance with claim 1 wherein said first layer comprises a surface of said recording paper.

7. A recording paper in accordance with claim 1 further comprising a permanently transparent protective layer overlying said second layer.

* * * * *